Sept. 10, 1929.    W. W. JONES, JR    1,727,986
WELDER'S TONGS
Filed Aug. 26, 1927
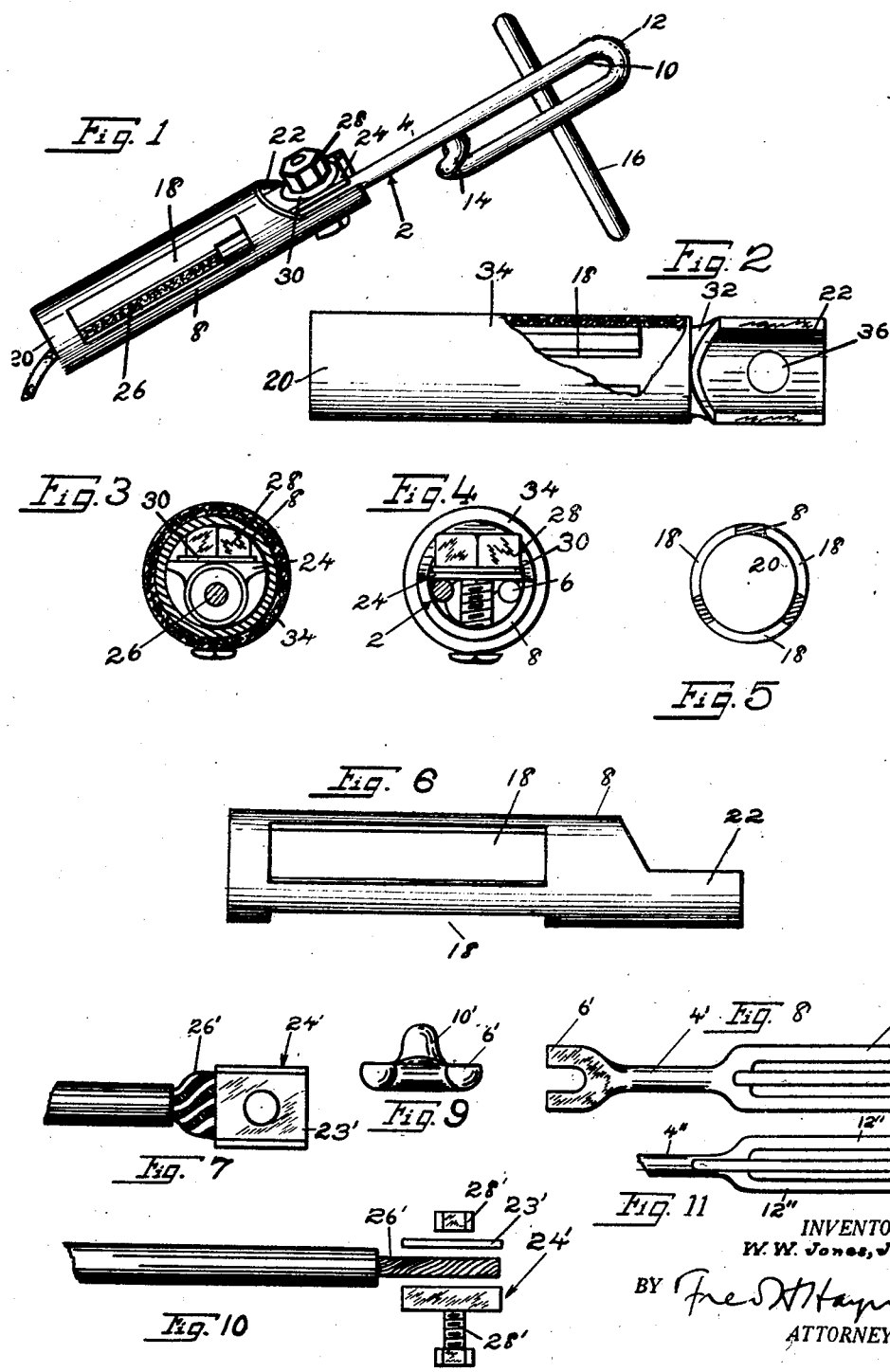
INVENTOR.
W. W. Jones, Jr.
BY
ATTORNEY.

Patented Sept. 10, 1929.

1,727,986

UNITED STATES PATENT OFFICE.

WILLIAM W. JONES, JR., OF LOS ANGELES, CALIFORNIA.

WELDER'S TONGS.

Application filed August 26, 1927. Serial No. 215,622.

My invention relates to tools, and more particularly to a pair of tongs adapted for a special use in welding, which tongs are adapted to have positioned between the jaws thereof a welding rod whereby said welding may be accomplished.

It accordingly is an object of my invention to provide a novel pair of welding tongs comprised of a pair of jaws preferably fashioned from a single strip of material of electric conductivity, there being a preferably wedge-shaped space between the jaws of said tongs for the reception of a welding rod, which rod may be replaced from time to time as needed, said jaws being equipped with a preferably detachable handle so constructed that there will be ample ventilation to keep said handle cool, the heat of the electric arc assisting materially in producing said ventilation.

It is also within the province of my invention to provide a novel form of handle and hand grip within which the jaws of the tongs are detachably connected, the electric lead extending through said handle and having its terminal anchored to said handle by any preferred means, such as a nut and bolt construction, a hand grip of insulating and non-conducting heat material being slipped over said handle and forming a driving fit therewith.

The above and further objects and advantages of my invention as hereinafter more particularly set forth, I attain by the construction set forth in the specification and illustrated in the drawings accompanying the same and forming a part of my application.

Reference is had to the accompanying drawings, in which similar reference characters denote similar parts. In the drawings, Fig. 1 is a perspective view showing my novel form of device with welding rod in position, but hand grip omitted, Fig. 2 is a top plan view on a somewhat enlarged scale of the handle and hand grip, parts being broken away to disclose the internal construction, Fig. 3 is a somewhat enlarged cross sectional view of the device, looking toward the jaws of the tongs, Fig. 4 is a cross sectional view through the device looking in the direction of the handle, Fig. 5 is an end elevation looking from the right in Fig. 2, Fig. 6 is a side elevational view of Fig. 2, Fig. 7 is a fragmentary top plan view of a modified form of electric terminal, Fig. 8 is a similar view of modified form of tongs, Fig. 9 is a somewhat enlarged end view of Fig. 8, looking from the left of said figure, Fig. 10 is an exploded side elevational view of the terminal and enclosing means shown in Fig. 7, and Fig. 11 is a fragmentary plan view of a still further modified form of tongs.

Describing my invention more in detail, I preferably form the jaws and anchoring means therefor from a single piece of material, which may be of any suitable configuration and cross section and a good conductor of electricity, means being provided to afford ample spring action so that the welding rod may be held between said jaws, and at the same time insure that crystallization and breakage of said jaws will effectively be prevented.

To this end the length of material, designated generally by the reference numeral 2, has its straight portion 4 connected at one end, and preferably integral therewith, the anchoring loop 6 by means of which the tongs are anchored to the handle 8, presently to be more particularly described, and at its other end preferably continued in integral relation to form the loop 10, which forms one jaw of my tongs, the other jaw 12 being also preferably integral with the jaw 10 by means of the loop or bent portion 14, which bent portion provides for the spring action between the jaws 10 and 12, the space therebetween being preferably wedge shaped, so that the welding rod 16 may be formed between the jaws 10 and 12 and securely held there, yet withal without any detrimental effect on said jaws, the portion 14 effectively preventing any crystallization of the parts or leakage thereof, and still provide the needed spring action to hold the rod 16.

The handle 8 may be of any preferred shape and constructed of any suitable material, but preferably of such material which has a low heat conductivity and also a poor conductor of electricity, if not an absolute non-conductor, said handle being preferably cylindrical and cut away longitudinally as at 18 to provide ventilating spaces, the end 20 being also open for this purpose, the other end 22 being open and cut away as shown in Figs. 1, 2 and 6, for ventilating purposes, and also for the reception of the anchoring loop 6, the preferably flat terminal 24 of the electric lead 26 which feeds the electric current to the jaws 10 and 12 and welding rod 16. Said terminal and loop 6 are held to the handle 8 by any suitable means, such as the nut and bolt construction 28, passes through the hole 36, a washer 30 being interposed so that the assembly may be held in secure relation.

The shape of the handle 8 may be any desired, and may be provided with a reduced portion 32 (see Fig. 2) so that a hand grip 34, preferably of fibre and a non-conductor of heat and electricity, said grip being slipped over the handle 8 and forming a driving fit therewith.

It will be understood, of course, that tongs of different sizes may be provided, of heavy or thin material, and of any preferred cross section, and this is also true of the welding rod 16, between which, and the material to be welded, the electric arc is formed.

One particular advantage of the use of my invention is that the hand may conveniently be rested during the welding operation, the handle moved turned and away from the work with a slight movement. The hand grip, moreover, effectively safeguards the operator against heat and electric shocks, said grip being effectively insulated, the heat of the arc providing for thorough ventilation of the handle by creating a draft therethrough, this thoroughly cooling said handle, features, which, so far as I am aware, are absent in known devices.

In the form of my invention depicted in Figs. 7–10 inclusive, I provide a somewhat different form of tongs 4', preferably of cast metal especially suitable for the objects intended, that is to say, having a fair electrical and heat conductivity, and one which will not have its temper changed when subjected to said conditions, the jaws 10' and 12', having a V-shaped opening therebetween, as in the other form of my invention, but having the loop omitted as seen in Fig. 8.

The enclosing loop 6 is also omitted and changed to a flat and rounded bifurcated portion 6', as seen in Figs. 8 and 9, to be engaged under the terminal 24', which is of special construction, that is, an open ended box-like structure having a plate cover 23', between which the flattened cable 26' is positioned, the assembly being secured together by the nut and bolt structure 28', passed through suitable holes in said terminal and cover.

If it is desired to provide a greater spring action for the jaws of the tongs, the upper jaw may extend somewhat further toward the anchoring bifurcated portion 6'. This feature is illustrated in Fig. 11, in which the upper jaw 10" of the tongs 4" extends further back than the form shown in Fig. 8, said upper and lower jaw 12" having also a V-shaped space therebetween.

While I have thus described my invention with great particularity, it will be clear that the same is susceptible of modifications throughout a wide range. I accordingly do not propose to be limited to the exact details of construction shown and described but reserve the right in practice to make any and all modifications thereof that fall within the scope of the appended claims.

I claim as my invention:

1. A welder's tongs comprising a pair of jaws, one consisting of one part, and the other of two parts, an extension on one of said jaws, a bifurcated portion on one end of said extension, a longitudinally extending perforated conductive structure, an electric lead extending through said structure, means for detachably connecting said lead and structure to said bifurcated portion, and an insulating handle positioned over said structure and said lead.

2. A welder's tongs comprising a pair of jaws, one of which is forked at one end, an extension on said jaw, a bifurcated portion on said extension, the other of said jaws being of single length and terminating short of said extension, a conductive structure, an electric lead extending through said structure, a nut and screw assembly for detachably holding said lead and said bifurcated portion to said structure and an insulating handle positioned over said structure.

In testimony whereof I have signed my name to this specification.

WILLIAM W. JONES, Jr.